(12) United States Patent
Borlick et al.

(10) Patent No.: US 9,513,827 B1
(45) Date of Patent: Dec. 6, 2016

(54) DETERMINING ADJUSTMENTS OF STORAGE DEVICE TIMEOUT VALUES BASED ON SYNCHRONOUS OR ASYNCHRONOUS REMOTE COPY STATE

(71) Applicant: INTERNATIONAL BUSINESS MACHINES CORPORATION, Armonk, NY (US)

(72) Inventors: Matthew G. Borlick, Tucson, AZ (US); Karl A. Nielsen, Tucson, AZ (US); Richard P. Oubre, Jr., San Jose, CA (US); Todd C. Sorenson, Tucson, AZ (US)

(73) Assignee: INTETRNATIONAL BUSINESS MACHINES CORPORATION, Armonk, NY (US)

(*) Notice: Subject to any disclaimer, the term of this patent is extended or adjusted under 35 U.S.C. 154(b) by 21 days.

(21) Appl. No.: 14/718,429

(22) Filed: May 21, 2015

(51) Int. Cl.
  *G06F 11/14* (2006.01)
  *G06F 3/06* (2006.01)
  *G06F 11/20* (2006.01)

(52) U.S. Cl.
  CPC .............. *G06F 3/0619* (2013.01); *G06F 3/065* (2013.01); *G06F 3/0665* (2013.01); *G06F 3/0689* (2013.01); *G06F 11/1446* (2013.01); *G06F 11/1448* (2013.01); *G06F 11/2056* (2013.01)

(58) Field of Classification Search
  CPC .... G06F 3/06; G06F 11/1446; G06F 11/1448; G06F 11/2056
  USPC .......................................... 711/114, 161, 162
  See application file for complete search history.

(56) References Cited

U.S. PATENT DOCUMENTS

| | | | |
|---|---|---|---|
| 7,275,177 B2 | 9/2007 | Armangau et al. | |
| 2004/0122871 A1* | 6/2004 | Hansen et al. | 707/204 |
| 2005/0240681 A1* | 10/2005 | Fujiwara et al. | 710/1 |
| 2006/0085575 A1* | 4/2006 | Hosouchi et al. | 710/38 |
| 2008/0028172 A1* | 1/2008 | Takahashi et al. | 711/162 |
| 2011/0167235 A1* | 7/2011 | Inoue et al. | 711/162 |
| 2012/0059799 A1* | 3/2012 | Oliveira et al. | 707/656 |
| 2015/0089509 A1 | 3/2015 | Brown et al. | |
| 2016/0092141 A1* | 3/2016 | Araki et al. | 711/165 |

* cited by examiner

*Primary Examiner* — Than Nguyen
(74) *Attorney, Agent, or Firm* — Rabindranath Dutta; Konrad Raynes Davda & Victor LLP

(57) ABSTRACT

A determination is made as to whether a plurality of storage volumes controlled by a processor complex are secondary storage volumes that are in an asynchronous copy relationship with a plurality of primary storage volumes. A storage device timeout value for a storage device that stores the plurality of storage volumes is changed from a predetermined low value to a predetermined high value, wherein the predetermined high value is indicative of a greater duration of time than the predetermined low value, in response to determining that each of the plurality of storage volumes controlled by the processor complex and stored in the storage device are secondary storage volumes that are in the asynchronous copy relationship with the plurality of primary storage volumes.

20 Claims, 10 Drawing Sheets

DETERMINING ADJUSTMENTS OF STORAGE DEVICE TIMEOUT VALUES BASED ON SYNCHRONOUS OR ASYNCHRONOUS REMOTE COPY STATE

BACKGROUND

1. Field

Embodiments relate to the determining of adjustments of storage device timeout values based on synchronous or asynchronous remote copy state.

2. Background

One or more storage controllers may be coupled to one or more of a plurality of hosts. The storage controllers may manage a plurality of storage devices, such as disk drives, tape drives, etc., that are coupled to the storage controllers. The plurality of hosts may access data stored in the storage devices via the storage controller.

One of the storage controllers may be a primary storage controller that is coupled to a secondary storage controller. Data stored in the primary storage controller may be copied synchronously or asynchronously to the secondary storage controller via remote copy operations, where the primary storage controller logical drives may be source drives (also referred to as "source") and the secondary storage controller logical drives may be target drives (also referred to as "target"). In synchronous copy, write commands from the host to the primary storage controller do not receive a completion message from the primary storage controller, until the data that is written on storage devices controlled by the primary storage controller have been copied over to the storage devices controlled by the secondary storage controller. In asynchronous copy, a host that sends a write command to the primary storage controller receives a completion message from the primary storage controller when the data is written to the storage devices controlled by the primary storage controller, without waiting for the data to be copied over to the storage devices controlled by the secondary storage controller. In asynchronous copy, the data written on storage devices controlled by the primary storage controller may be copied to the storage devices controlled by secondary storage controller after the host has received the completion message.

A redundant array of independent disks (RAID) is a data storage virtualization technology that combines a plurality of disk drive components into a single logical unit for the purposes of data redundancy or performance improvement. Data may be duplicated and/or distributed across the disk drives in one of several ways, referred to as RAID levels, depending on the specific level of redundancy and performance.

In many situations, an input/output (I/O) command may be sent from a host to a storage controller that controls a storage device. A predetermined period of time referred to as a timeout value may be set for the storage device. If the storage controller is unable to secure a response from the storage device within the predetermined period of time after performing operations with respect to the storage device, the storage device is indicated as being timed out for the I/O command.

SUMMARY OF THE PREFERRED EMBODIMENTS

Provided are a method, a system, and a computer program in which a determination is made as to whether a plurality of storage volumes controlled by a processor complex are secondary storage volumes that are in an asynchronous copy relationship with a plurality of primary storage volumes. A storage device timeout value for a storage device that stores the plurality of storage volumes is changed from a predetermined low value to a predetermined high value, where the predetermined high value is indicative of a greater duration of time than the predetermined low value, in response to determining that each of the plurality of storage volumes controlled by the processor complex and stored in in the storage device are secondary storage volumes that are in the asynchronous copy relationship with the plurality of primary storage volumes.

In further embodiments, the storage device timeout value is assigned with the predetermined low value, in response to determining that not each of the plurality of storage volumes controlled by the processor complex and stored in the storage device are secondary storage volumes that are in the asynchronous copy relationship with the plurality of primary storage volumes.

In yet further embodiments, the storage device timeout value is assigned with the predetermined low value, in response to determining that at least one storage volume of the plurality of storage volumes controlled by the processor complex and stored in the storage device is a secondary storage volume that is in a synchronous copy relationship with a primary storage volume of the plurality of primary storage volumes.

In additional embodiments, the storage device timeout value is assigned with the predetermined low value, in response to determining that at least one storage volume of the plurality of storage volumes controlled by the processor complex and stored in the storage device is a primary storage volume that is in an asynchronous or a synchronous copy relationship with at least one secondary storage volume of the plurality of storage volumes.

In yet additional embodiments, the processor complex is a first processor complex of a secondary storage controller, where the first processor complex of the secondary storage controller performs a synchronization of the secondary storage volumes with a second processor complex of the secondary storage controller, prior to the changing of the storage device timeout value, and where the secondary storage controller controls the secondary storage volumes, and is in a copy service relationship with a primary storage controller that controls the plurality of primary storage volumes.

In further embodiments, a request from a host times out if data corresponding to the request is not retrieved from the storage device within a time indicated by the storage device timeout value.

In yet further embodiments, the determining of whether the plurality of storage volumes controlled by a processor complex are secondary storage volumes that are in an asynchronous copy relationship with a plurality of primary storage volumes, is performed in response to determining that a dynamic storage device timeout indicator is enabled in the processor complex.

BRIEF DESCRIPTION OF THE DRAWINGS

Referring now to the drawings in which like reference numbers represent corresponding parts throughout.

DETAILED DESCRIPTION

Figure 1:
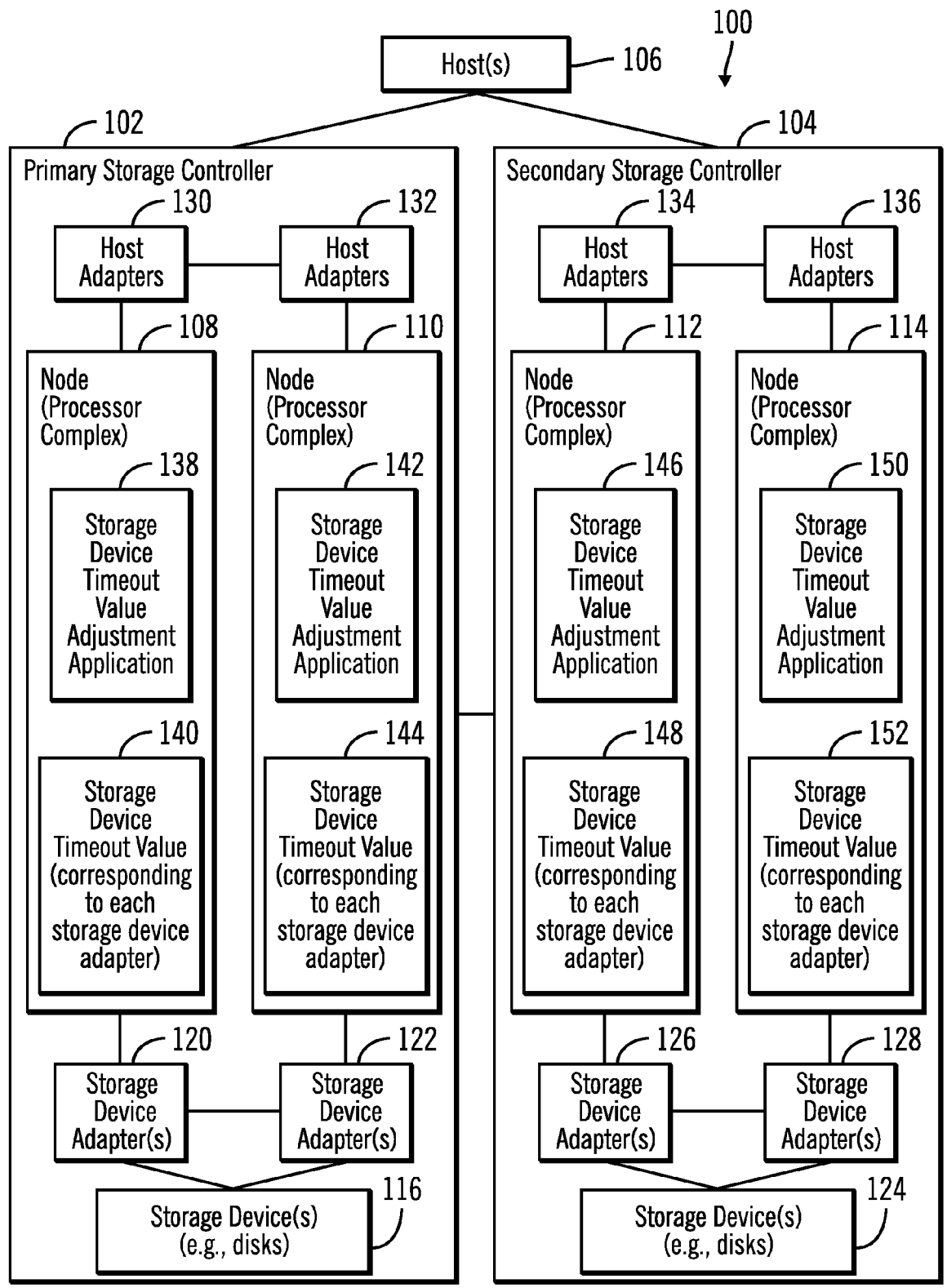
FIG. 1 illustrates a block diagram of a computing environment comprising a primary storage controller and a secondary storage controller that are coupled to one or more hosts, in accordance with certain embodiments.

In the following description, reference is made to the accompanying drawings which form a part hereof and which illustrate several embodiments. It is understood that other embodiments may be utilized and structural and operational changes may be made.

Storage Device Timeout Adjustments and Array Rebuilds

In high performance computing systems, disk response times that are expected by customers have decreased considerably. For example, if disk drives do not respond within 5 seconds then in certain situations a disk array may have to be rebuilt. Low timeout values for disks may create problems in certain circumstances.

The secondary storage controller may often receive only write I/Os. However, I/O errors are usually determined during reads as data is typically checked during read I/Os. If a secondary storage controller only receives writes it is less likely that media errors would be detected on storage devices controlled by the secondary storage controller. Secondary storage controllers may have background processes that are very time consuming and such background processes may scan the entirety of the secondary disks to determine media errors.

In secondary storage controllers, when a disk system is used solely as a target of remote copy operations the disks within the disk system may receive very few or no read I/Os. On disk systems that receive few or no read I/Os, disks media errors are less likely to be detected which can result in data loss during sparing in a RAID system. In addition, in order to enhance performance, host systems with low response time requirements may set the disk timeout settings to be as low as possible. The setting of these disk timeout to be low helps guarantee response times in disk error scenarios.

However, in order to meet low response time requirements, the drive causing the timeout may be immediately rejected and may be completely spared out. When a drive is spared out an array rebuild has to occur. As a result, reducing disk timeout settings in order to guarantee response times has the side effect of increasing the likelihood of array rebuilds. If a media error occurs during an array rebuild then data loss may occur. Thus the secondary storage controller in a peer to peer remote copy (PPRC) copy services relationship is more likely to have data loss due to media errors during array rebuilds when disk timeout settings are set low for performance reasons, and furthermore the secondary storage controller is less likely to detect the media errors due to the lack of read I/Os. Thus in secondary storage controllers where there is little or no read I/O if the disk timeout value if it is low can cause frequent time consuming array rebuilds.

Certain embodiments provide mechanisms to dynamically change the disk timeout settings of a secondary storage system based on the type of remote copy relationship existing for the disk system. In case there are no synchronous remote copies being done to the secondary storage controller there is no benefit to performance to reduce the disk timeout settings on the secondary storage controller, as the copies are done asynchronously to the secondary storage controller in response to host I/O on the primary storage controller. Since the asynchronous operation on the secondary storage controller can wait for a significant period of time there is no need to be in a situation that leads to a likelihood of an array rebuild by timing out writes to storage devices controlled by the secondary storage controller. This reduces the chance of having data loss due to a media error happening during an array rebuild.

Therefore, in case storage volumes controlled by the secondary storage controller are in an asynchronous relationship then the disk timeout value in the secondary storage controller may be set to a high timeout value. However, in other situations (e.g., the storage volume is a primary storage volume or is a secondary storage volume that is in a synchronous relationship) there may be benefit to performance in reducing the disk timeout value settings and the low disk timeout value (e.g., 5 seconds) provided by a customer may be used.

Exemplary Embodiments

FIG. 1 illustrates a block diagram of a computing environment 100 comprising a primary storage controller 102 and a secondary storage controller 104 that are coupled to one or more hosts 106, in accordance with certain embodiments.

The primary storage controller 102, the secondary storage controller 104, and the one of more hosts 106 may comprise any suitable computational device known in the art, such as, such as, a personal computer, a workstation, a server, a mainframe, a hand held computer, a palm top computer, a telephony device, a network appliance, a blade computer, a processing device, etc. The primary storage controller 102, the secondary storage controller 104, and the one of more hosts 106 may be elements in any suitable network, such as, a storage area network, a wide area network, the Internet, an intranet. In certain embodiments, the primary storage controller 102, the secondary storage controller 104, and the one of more hosts 106 may be elements in a cloud computing environment.

In certain embodiments, the primary storage controller and the secondary storage controller may each have one or more nodes that are processing complexes, where a processing complex may comprise a computational device. For example, the primary storage controller 102 may have two nodes 108, 110 and the secondary storage controller may have two nodes 112, 114. The two nodes 108, 110 provide redundancy within the primary storage controller 102, such that if one of the two nodes fail the other node can take over the operations of the failed node. Similarly the two nodes 112, 114 provide redundancy within the secondary storage controller 104, such that if one of the two nodes fail the other node can take over the operations of the failed node. The two nodes of a storage controller periodically synchronize their state with each other so that one node can take over the operations of the other, if any of the two nodes fail.

The nodes 108, 110 are coupled to storage devices 116 via storage device adapters 120, 122 respectively. Similarly nodes 112, 114 are coupled to storage devices 124 via storage device adapters 126, 128 respectively. The storage device adapters 120, 122 are configured such that the nodes 108, 110 of the primary storage controller 102 can substitute each other in the event of a failure of one of the nodes. Similarly, the storage device adapters 126, 128 are configured such that the nodes 112, 114 of the secondary storage controller 104 can substitute each other in the event of a failure of one of the nodes.

The nodes 108, 110 are coupled to the hosts 106 via host adapters 130, 132 respectively. Similarly nodes 112, 114 are coupled to the hosts 106 via host adapters 134, 136 respectively. The host adapters 130, 132 are configured such that the nodes 108, 110 of the primary storage controller 102 can substitute each other in the event of a failure of one of the nodes. Similarly, the host adapters 134, 136 are configured such that the nodes 112, 114 of the secondary storage controller 104 can substitute each other in the event of a failure of one of the nodes.

Each node includes a storage device timeout value adjustment application and a storage device timeout value corresponding to a storage device controlled by the node via a storage device adapter. For example, in node 108, the storage device timeout value adjustment application 138 assigns the storage device timeout value 140 of a storage device adapter 120. Similarly nodes 110, 112, 114 includes storage device timeout value adjustment application 142, 146, 150 and storage device timeout values 144, 148, 152 as shown in FIG. 1.

Therefore, FIG. 1 illustrates certain embodiments in which each node 108, 110, 112, 114 may adjust the storage device timeout value 140, 144, 148, 152 of each storage device controlled by the node.

Figure 2:
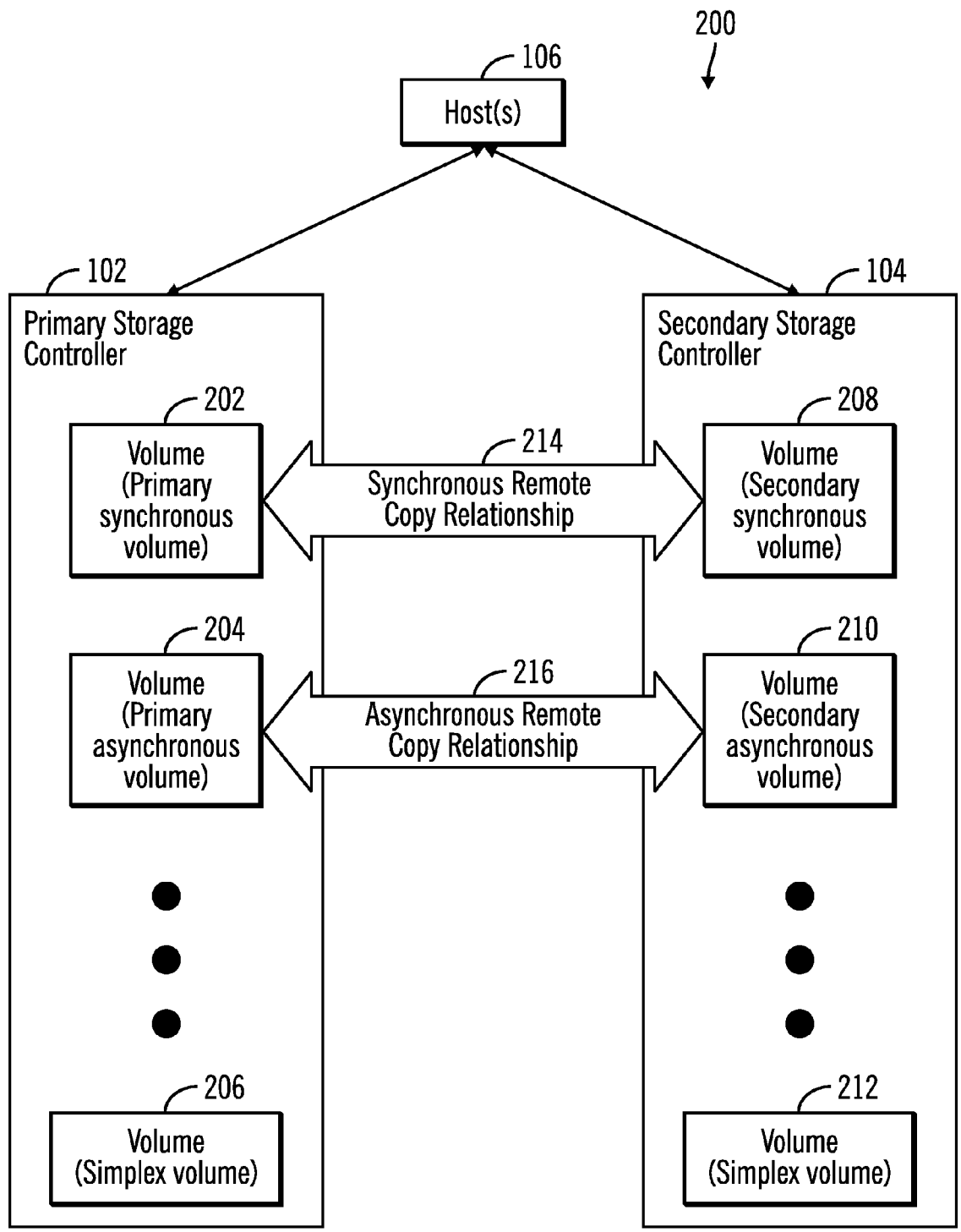
FIG. 2 illustrates a block diagram that shows synchronous copy relationships and asynchronous copy relationships, in accordance with certain embodiments.

FIG. 2 illustrates a block diagram 200 that shows synchronous copy relationships and asynchronous copy relationships in the primary storage controller 102 and the second storage controller 104, in accordance with certain embodiments. The primary storage controller 102 may control a plurality of volumes, such as volumes 202, 204, 206. The secondary storage controller 104 may control a plurality of volumes 208, 210, 212. The plurality of volumes 202, 204, 206 are logical representations of storage volumes physically stored in the storage device 116, and the plurality of volumes 208, 210, 212 are logical representations of storage volumes physically stored in the storage devices 124.

In certain embodiments volume 202 of the primary storage controller 102 is in a synchronous remote copy relationship 214 with volume 208 of the secondary storage controller 104, and volume 204 of the primary storage controller 102 is in an asynchronous remote copy relationship 216 with volume 210 of the secondary storage controller 104. For example, when host 106 sends a synchronous write command to the primary storage controller 102 and the node 108 writes the data corresponding to the write command to volume 202 (referred to as primary synchronous volume) the data is copied synchronously to volume 208 (also referred to as secondary synchronous volume), and only after copying of the data to volume 208 is over does the primary storage controller 102 via the node 108 responds to the host 106 that the synchronous write operation is complete.

When the host 106 sends an asynchronous write command to the primary storage controller 102 and the node 108 writes the data corresponding to the write command to volume 204 (referred to as primary asynchronous volume) the data is copied asynchronously to volume 210 (also referred to as secondary asynchronous volume), and the primary storage controller 102 via the node 108 responds to the host 106 that the asynchronous write operation is complete even prior to completion of the copying of data to the volume 210.

FIG. 2 also shows that the primary storage controller 102 may have one or more simplex volumes 206 and the secondary storage controller 104 may have one or more simplex volumes 212. A simplex volume is not in a copy relationship, so it is neither a primary nor a secondary. For the purposes of the embodiments described in this disclosure the volumes in a copy services relationship are those that are described. The presence of a simplex volume does not change the embodiments described in this disclosure. However, if a storage controller contains only simplex volumes, low timeout settings are used for storage devices.

Figure 3:
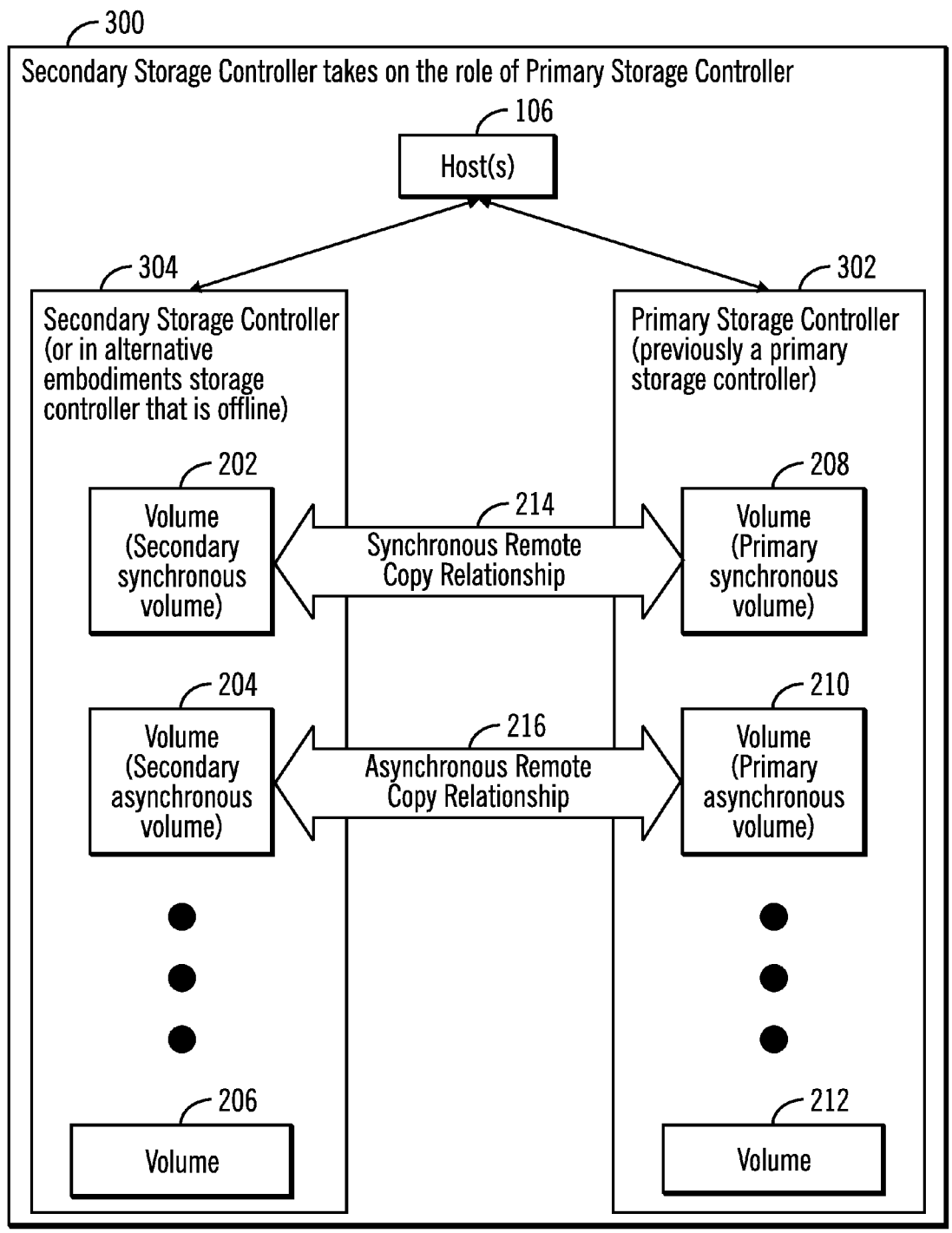
FIG. 3 illustrates a block diagram that shows a primary storage controller that was previously a secondary storage controller, in accordance with certain embodiments.

FIG. 3 illustrates a block diagram 300 that shows the secondary storage controller 104 of FIG. 2 taking on the role of a primary storage controller, in response to certain events such as the failure of the primary storage controller 102 or as a result of a temporary maintenance of the primary storage controller 102, in accordance with certain embodiments. In such embodiments, reference numeral 302 shows a primary storage controller that was previously a secondary storage controller (shown via reference numeral 104 in FIG. 2. Similarly, in certain embodiments, reference numeral 304 shows a secondary storage controller that was previously a primary storage controller (shown via reference numeral 102 in FIG. 2). In some embodiments the secondary storage controller 304 may be offline.

In certain embodiments, volume 202 of the secondary storage controller 304 is in a synchronous remote copy relationship 214 with volume 208 of the primary storage controller 302, and volume 204 of the secondary storage controller 304 is in an asynchronous remote copy relationship 216 with volume 210 of the primary storage controller 302.

The roles of the primary and secondary storage controllers have been swapped in FIG. 3 in comparison to FIG. 2. Therefore, volume 208 is now a primary synchronous volume, and volume 210 is now a primary asynchronous volume, volume 202 is a secondary synchronous volume, and volume 204 is a secondary asynchronous volume.

Therefore, FIG. 3 illustrates certain embodiments in which the roles of the primary and secondary storage volumes may be reversed from primary to secondary and from secondary to primary. In other words, a storage controller may at certain times operate as a primary storage controller and at other times operate as a secondary storage controller and volumes in the storage controller may operate as a primary volumes at certain times and as secondary volumes at certain other times, in either a synchronous or an asynchronous relationship.

Figure 4:
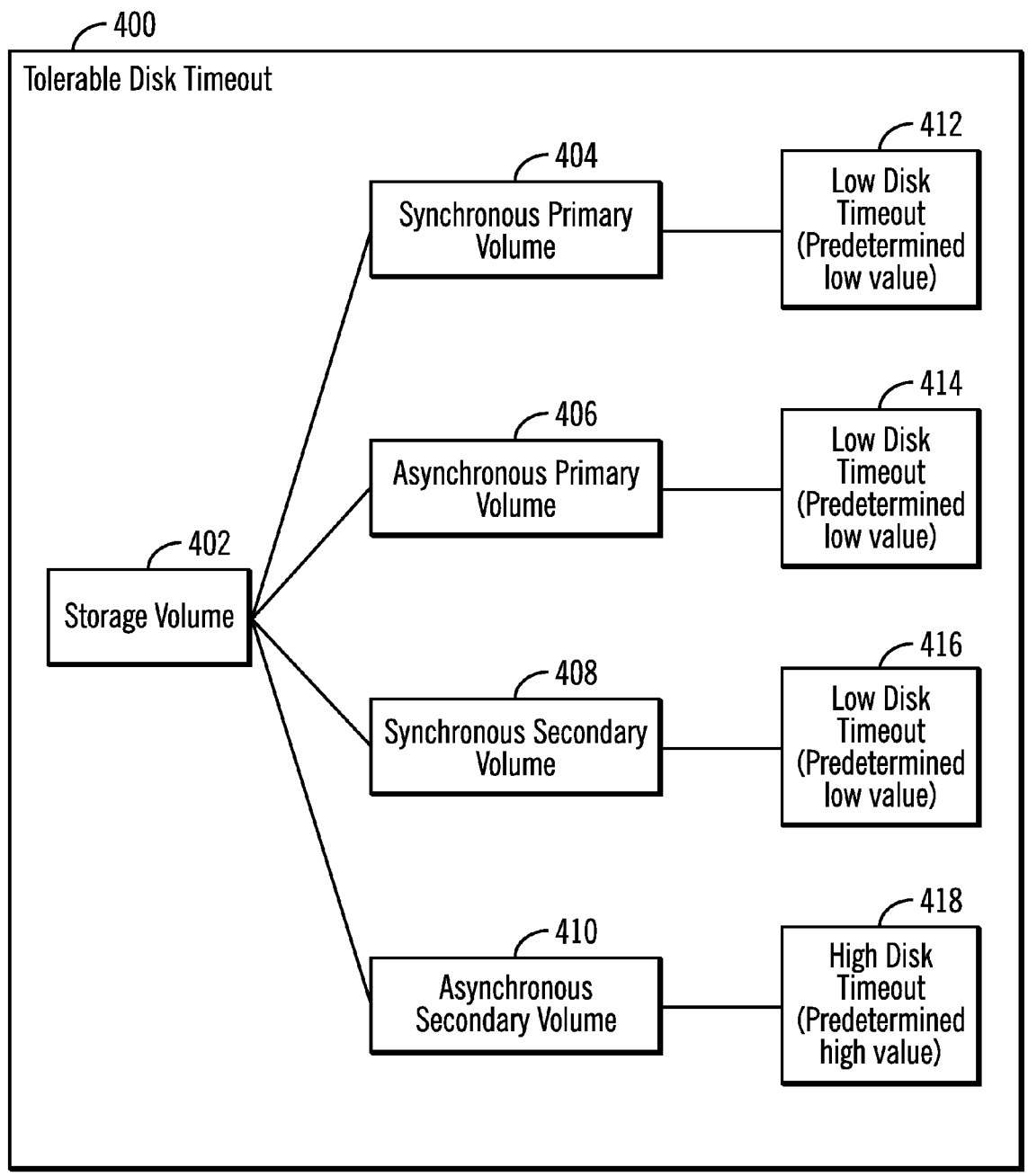
FIG. 4 illustrates a block diagram that shows tolerable disk timeouts, in accordance with certain embodiments.

FIG. 4 illustrates a block diagram 400 that shows tolerable disk timeouts, in accordance with certain embodiments. As shown in FIG. 2 and FIG. 3, a storage volume 402 may be in one of four states:

(i) Synchronous primary volume 404;
(ii) Asynchronous primary volume 406;
(iii) Synchronous secondary volume 408; and
(iv) Asynchronous secondary volume 410.

In certain embodiments, in case the storage volume 402 is in a synchronous primary volume 404, an asynchronous primary volume 406, or a synchronous secondary volume 408 then a storage device, such as a storage disk, that stores the storage volume 402 may have a low disk timeout value 412, 414, 416 (i.e., the storage device timeout value is low such as 5 seconds). In comparison, in embodiments in which the storage volume 402 is an asynchronous secondary volume 410, then a storage device, such as a storage disk, that stores the storage volume 402 may have a high disk timeout value 418 (e.g., 20 seconds) if all volumes stored in the storage disk are asynchronous secondary volumes. The high disk timeout value 418 may be significantly higher than the low disk timeout values 412, 414, 416 to reduce the possibility of unnecessary array rebuilds in the secondary storage controller 104.

Figure 5:
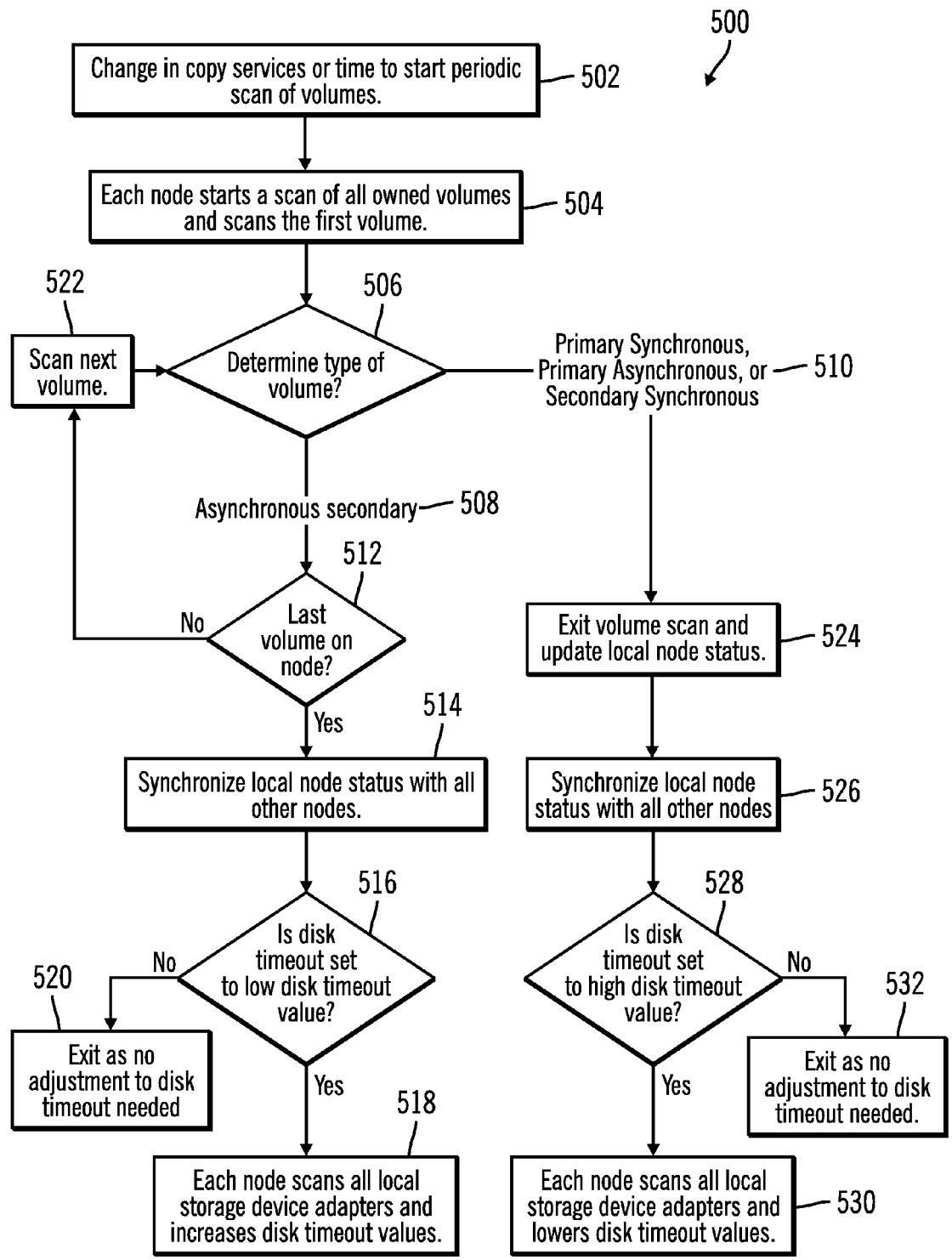
FIG. 5 illustrates a first flowchart that shows adjustments of storage device timeout values, in accordance with certain embodiments.

FIG. 5 illustrates a first flowchart 500 that shows adjustments of storage device timeout values, in accordance with certain embodiments. The operations shown in FIG. 5 may be performed by any of the storage device timeout value adjustment applications 138, 142, 146, 150 that execute in the nodes 108, 110, 112, 114 of the storage controllers 102, 104. For ease of illustration the operations are described as being performed by nodes of a storage controller.

Control starts at block 502 in which one or more nodes of a storage controller determines that there is a change in copy services that is occurring in the storage controller or that it is time to perform a periodic scan of all volumes owned (i.e., controlled) by the node.

Control proceeds to block 504 in which each node of the storage controller starts a scan of all volumes owned by the node and scans the first volume. Control proceeds to block 506 in which a determination of the type of volume is made.

If at block 506 it is determined that the volume is an asynchronous secondary volume (branch 508) then control proceeds to block 512 in which a determination is made as to whether it is the last volume to be scanned by the node. If so, then control proceeds to block 514 in which the local node status is synchronized with all other nodes.

Control proceeds from block 514 to block 516 in which a determination is made as to whether the disk timeout (i.e., storage device timeout) value is set to a low disk timeout value. If so, then each node of the storage controller scans (at block 518) all local storage device adapters and increases the disk timeout values to a high disk timeout value. If not, then the process exits (at block 520).

If at block 512 it is determined that the volume being scanned is not the last volume to be scanned by the node, then the next volume is scanned (at block 522) and control returns to block 506.

If at block 506, a determination is made that the type of volume is a primary synchronous, a primary asynchronous, or a secondary synchronous volume (branch 510) then control proceeds to block 524 where the volume scan is exited and the local node status updated (at block 524) and then the local node status is synchronized with all other nodes (at block 526).

From block 526 control proceeds to block 528 in which a determination is made as to whether the disk timeout is set to a high disk timeout value. If so, then each node scans all local storage device adapters and lowers the disk timeout values (at block 530) to a low disk timeout value. If not, control proceeds to block 532 in which the process exits as no adjustment to disk timeout values are needed.

Therefore FIG. 5 describes certain embodiments in which only if all volumes of a disk are asynchronous secondary volumes are the disk timeout values increased or maintained at a high timeout value. Otherwise, the disk timeout values of a disk are reduced to a low timeout value or maintained at a low timeout value in case any of the volumes on the disk are primary volumes (synchronous or asynchronous) or a synchronous secondary volume.

Figure 6:
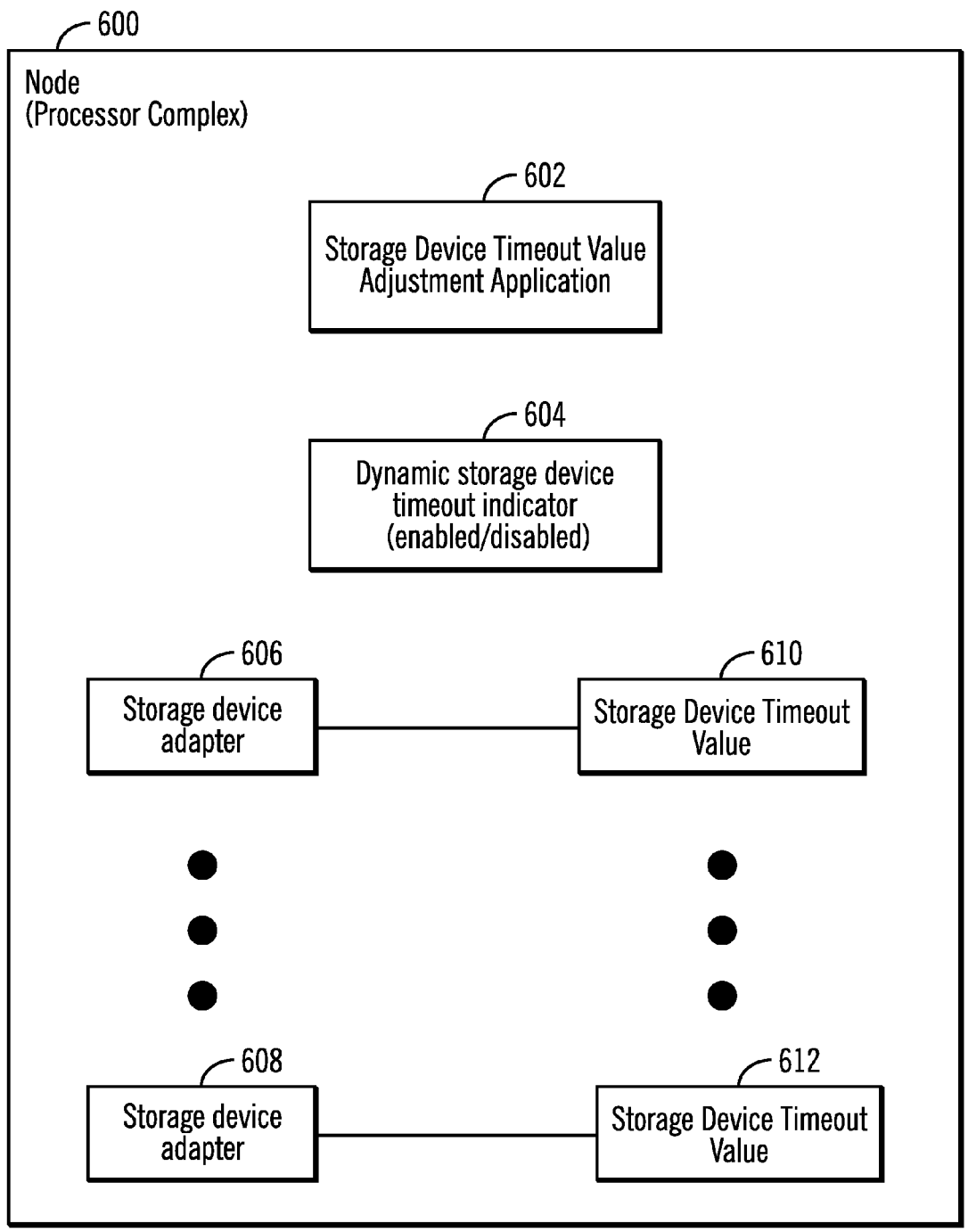
FIG. 6 illustrates a block diagram of applications and data structures in a processor complex of a storage controller, in accordance with certain embodiments.

FIG. 6 illustrates a block diagram 600 of applications and data structures in a processor complex (i.e., node) 600 of a storage controller (such as storage controllers 102, 104), in accordance with certain embodiments. The processor complex includes a storage device timeout value adjustment application 602 and a dynamic storage device timeout indicator 604 that may be enabled or disabled.

If the dynamic storage device timeout indicator 604 is enabled then the storage device timeout values may be adjusted for improving the performance of the storage controllers that include the node 600. For each storage device adapter 606 . . . 608 that is used by the node 600 to control storage devices there is an associated storage device timeout value 610 . . . 612, where the storage device time values 610 . . . 612 may be adjusted in accordance with embodiments described earlier in FIGS. 1-5.

Figure 7:
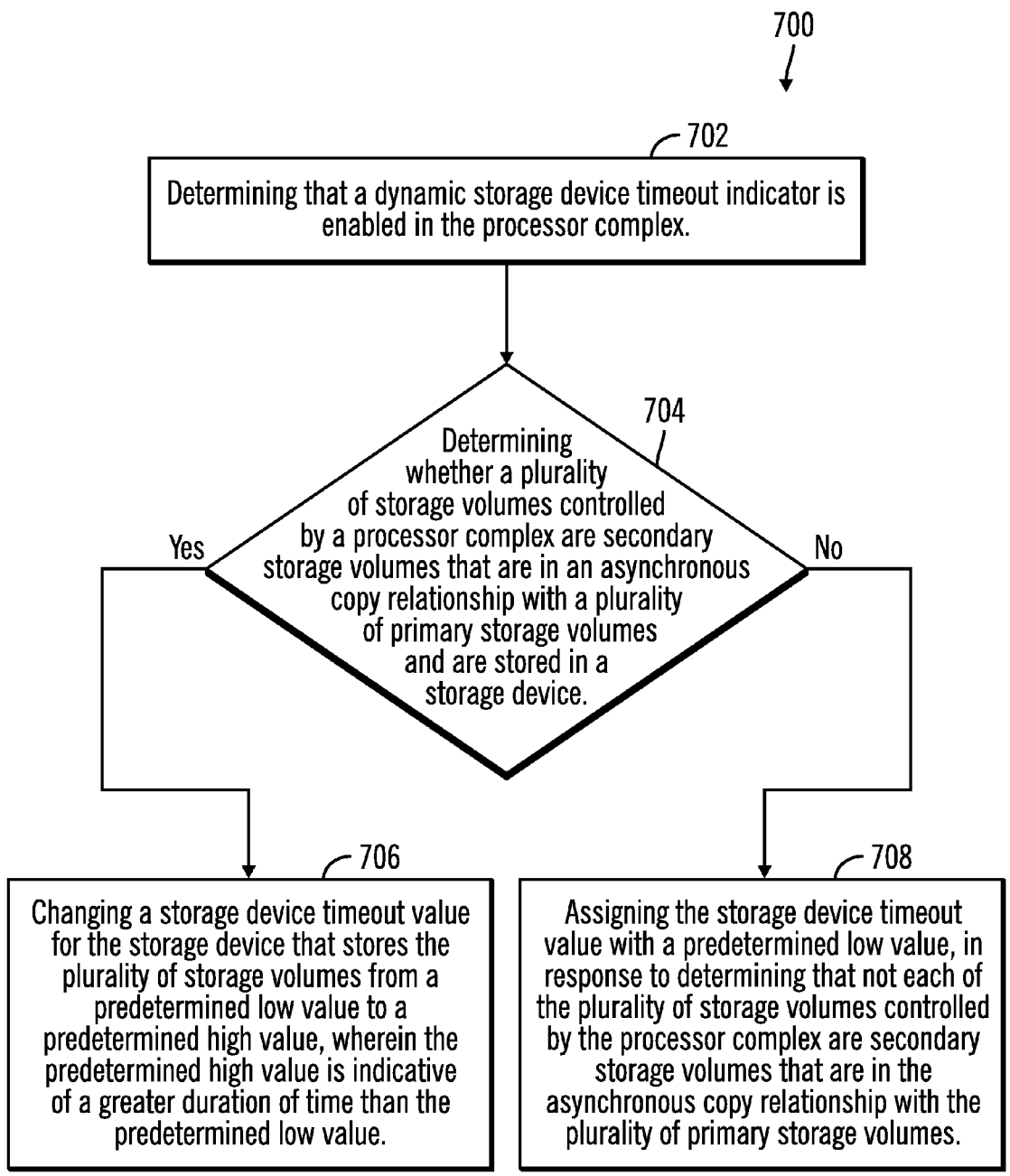
FIG. 7 illustrates a second flowchart that shows adjustments of storage device timeout values, in accordance with certain embodiments.

FIG. 7 illustrates a second flowchart that shows adjustments of storage device timeout values, in accordance with certain embodiments. The operations shown in FIG. 7 may be performed by any of the storage device timeout value adjustment applications 138, 142, 146, 150 that execute in the nodes 108, 110, 112, 114 of the storage controllers 102, 104.

Control starts at block 702 in which a determination is made that a dynamic storage timeout indicator 604 is enabled in a processor complex 600 of a storage controller such as 102, 104.

Control proceeds to block 704 in which a determination is made as to whether a plurality of storage volumes controlled by the processor complex 600 are secondary storage volumes that are in an asynchronous copy relationship with a plurality of primary storage volumes and are stored in the storage device.

In response to determining that each of the plurality of storage volumes controlled by the processor complex are secondary storage volumes that are in an asynchronous copy relationship with the plurality of primary storage volumes and stored in the storage device ("Yes" branch from block 704), control proceeds to block 706. At block 706, a storage device timeout value for a storage device that stores the plurality of storage volumes is changed from a predetermined low value to a predetermined high value, where the predetermined high value is indicative of a greater duration of time than the predetermined low value.

In response to determining that each of the plurality of storage volumes controlled by the processor complex are not secondary storage volumes that are in an asynchronous copy relationship with the plurality of primary storage volumes and stored in the storage device ("No" branch from block 704), control proceeds to block 708. At block 708, the storage device timeout value is assigned with a predetermined low value, where the predominated low value is indicative of a lower duration of time than the predetermined high value.

Therefore, FIGS. 1-7 illustrate certain embodiments in which if all volumes on a storage device are asynchronous secondary volumes then the storage device that only storages the asynchronous secondary volumes are configured to have a storage device timeout value that is a high storage device timeout value. In other words, at least two different storage device timeout values are maintained for a storage device. A high timeout value is used for a storage device when the storage device stores only asynchronous secondary volumes. A low timeout value is used for a storage device, if the storage device stores at least one primary volume irrespective of whether it is in a synchronous or asynchronous relationship or if the storage device stores at least one synchronous secondary volume. The low timeout value may be significantly lower than the high timeout value. For example, in certain embodiments the low timeout value may be 5 seconds and may be 25% of the high timeout value.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
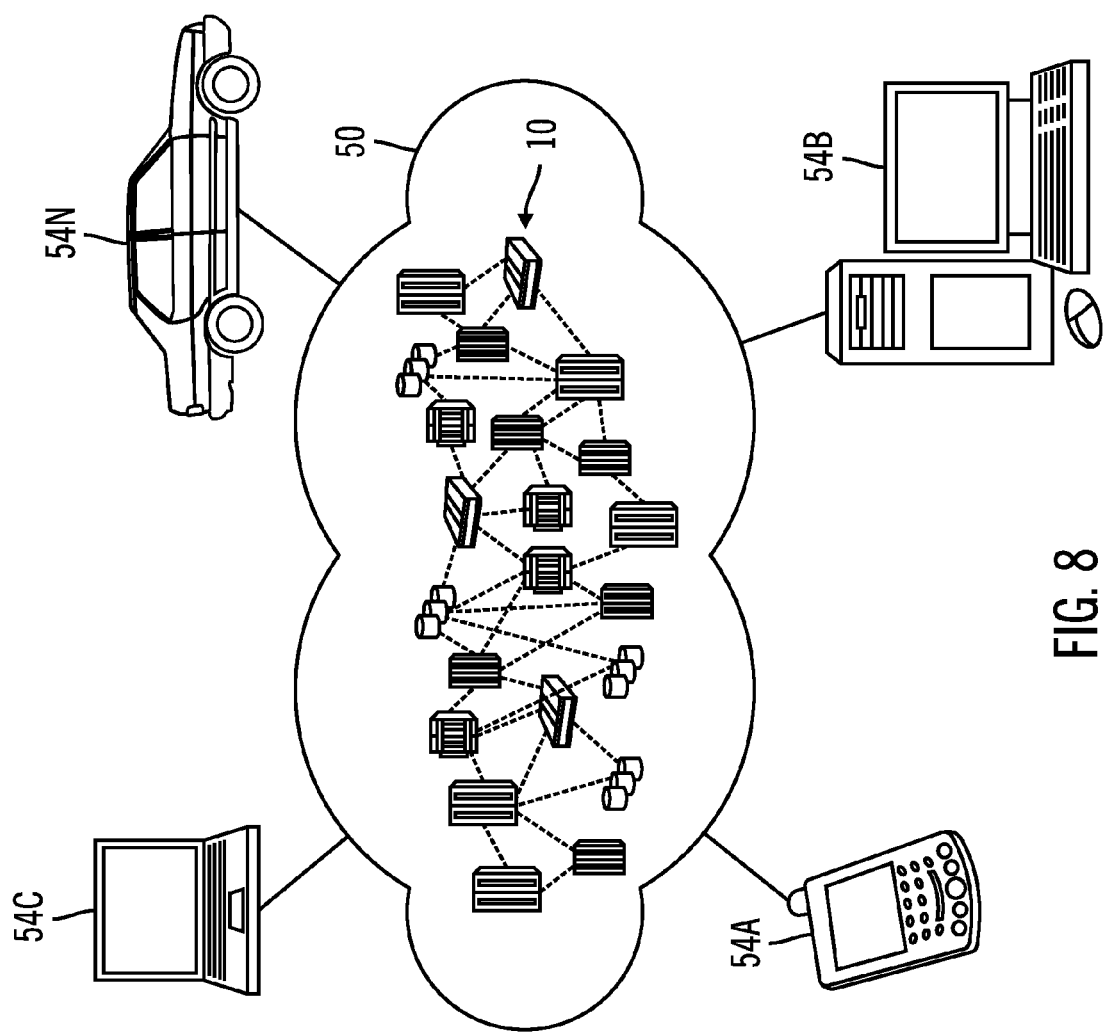
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
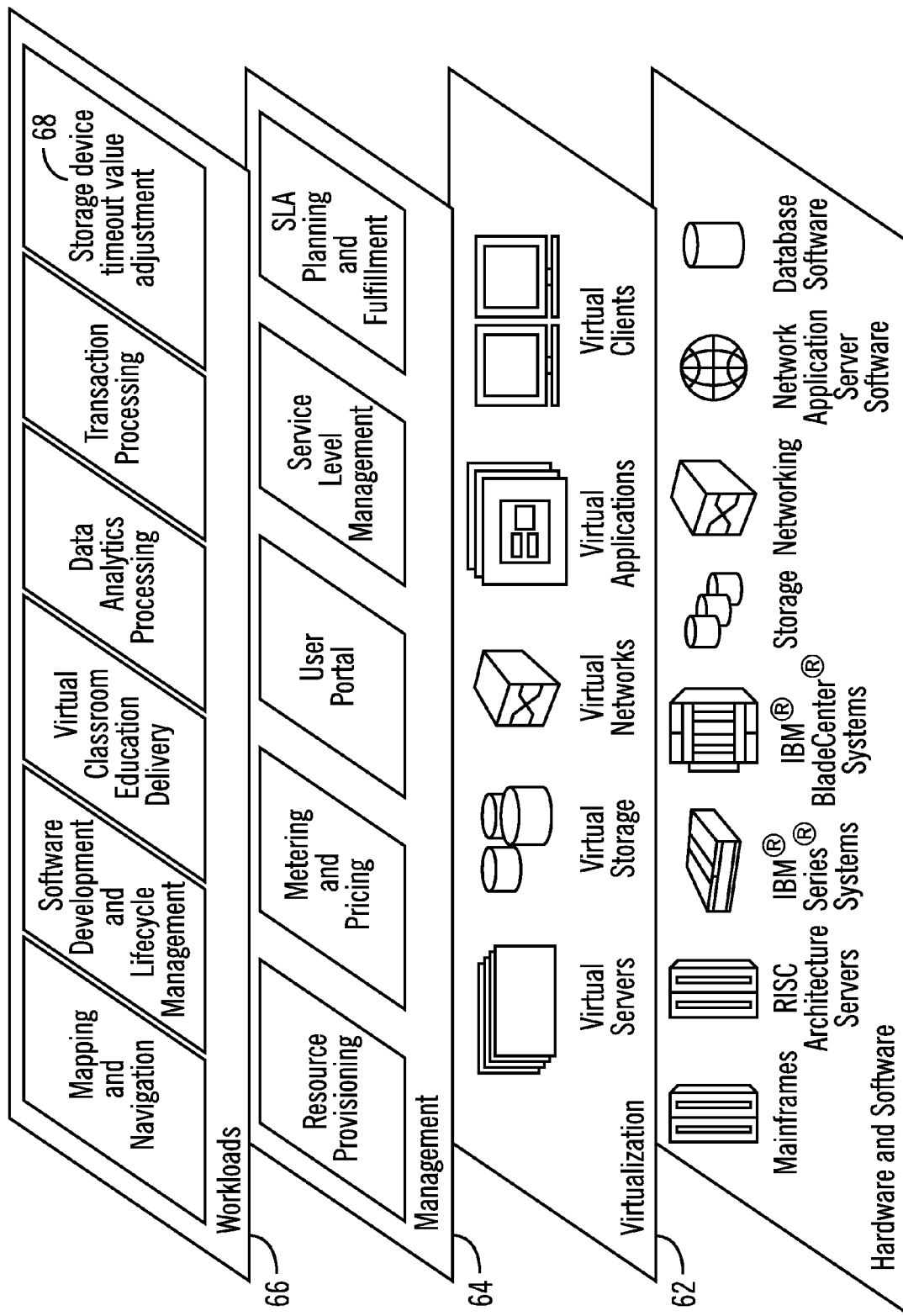
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the storage device timeout value adjustment 68 (as shown in FIGS. 1-9).

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
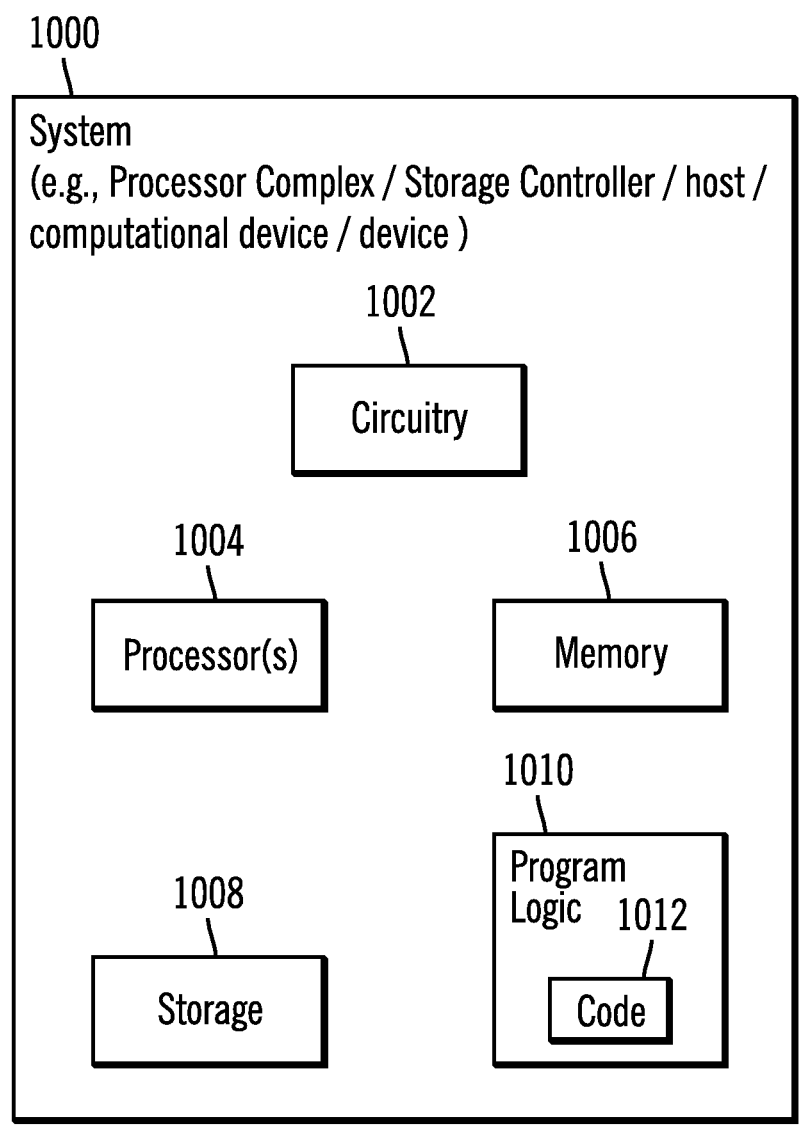
FIG. 10 illustrates a block diagram of a computational system that shows certain elements that may be included in the storage controllers or the host shown in FIG. 1, in accordance with certain embodiments.

FIG. 10 illustrates a block diagram that shows certain elements that may be included in the hosts 106 or the storage controllers 102, 104 or the nodes 108, 110, 112, 114, 600 of the storage controllers 102, 104, or in other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. affiliates.

What is claimed is:

1. A method, comprising:
   determining whether a plurality of storage volumes controlled by a processor complex are secondary storage volumes that are in an asynchronous copy relationship with a plurality of primary storage volumes; and
   changing a storage device timeout value for a storage device that stores the plurality of storage volumes from a predetermined low value to a predetermined high value, wherein the predetermined high value is indicative of a greater duration of time than the predetermined low value, in response to determining that each of the plurality of storage volumes controlled by the processor complex and stored in the storage device are secondary storage volumes that are in the asynchronous copy relationship with the plurality of primary storage volumes.

2. The method of claim 1, the method further comprising:
   assigning the storage device timeout value with the predetermined low value, in response to determining that not each of the plurality of storage volumes controlled by the processor complex and stored in the storage device are secondary storage volumes that are in the asynchronous copy relationship with the plurality of primary storage volumes.

3. The method of claim 1, the method further comprising:
   assigning the storage device timeout value with the predetermined low value, in response to determining that at least one storage volume of the plurality of storage volumes controlled by the processor complex and stored in the storage device is a secondary storage volume that is in a synchronous copy relationship with a primary storage volume of the plurality of primary storage volumes.

4. The method of claim 2, the method further comprising:
   assigning the storage device timeout value with the predetermined low value, in response to determining that at least one storage volume of the plurality of storage volumes controlled by the processor complex and stored in the storage device is a primary storage volume that is in an asynchronous or a synchronous copy relationship with at least one secondary storage volume of the plurality of storage volumes.

5. The method of claim 1, wherein the processor complex is a first processor complex of a secondary storage controller, wherein the first processor complex of the secondary storage controller performs a synchronization of the secondary storage volumes with a second processor complex of the secondary storage controller, prior to the changing of the storage device timeout value, and wherein the secondary storage controller controls the secondary storage volumes, and is in a copy service relationship with a primary storage controller that controls the plurality of primary storage volumes.

6. The method of claim 1, wherein a request from a host times out if data corresponding to the request is not retrieved from the storage device within a time indicated by the storage device timeout value.

7. The method of claim 1, wherein the determining of whether the plurality of storage volumes controlled by a processor complex are secondary storage volumes that are in an asynchronous copy relationship with a plurality of primary storage volumes, is performed in response to determining that a dynamic storage device timeout indicator is enabled in the processor complex.

8. A system, comprising:
a memory; and
a processor coupled to the memory, wherein the processor performs operations, the operations comprising:
determining whether a plurality of storage volumes are secondary storage volumes that are in an asynchronous copy relationship with a plurality of primary storage volumes; and
changing a storage device timeout value for the storage device that stores the plurality of storage volumes from a predetermined low value to a predetermined high value, wherein the predetermined high value is indicative of a greater duration of time than the predetermined low value, in response to determining that each of the plurality of storage volumes are stored in the storage device and are secondary storage volumes that are in the asynchronous copy relationship with the plurality of primary storage volumes.

9. The system of claim 8, the operations further comprising:
assigning the storage device timeout value with the predetermined low value, in response to determining that not each of the plurality of storage volumes stored in the storage device are secondary storage volumes that are in the asynchronous copy relationship with the plurality of primary storage volumes.

10. The system of claim 8, the operations further comprising:
assigning the storage device timeout value with the predetermined low value, in response to determining that at least one storage volume of the plurality of storage volumes stored in the storage device is a secondary storage volume that is in a synchronous copy relationship with a primary storage volume of the plurality of primary storage volumes.

11. The system of claim 9, the operations further comprising:
assigning the storage device timeout value with the predetermined low value, in response to determining that at least one storage volume of the plurality of storage volumes stored in the storage device is a primary storage volume that is in an asynchronous or a synchronous copy relationship with at least one secondary storage volume of the plurality of storage volumes.

12. The system of claim 8, wherein the system is a first processor complex of a secondary storage controller, wherein the first processor complex of the secondary storage controller performs a synchronization of the secondary storage volumes with a second processor complex of the secondary storage controller, prior to the changing of the storage device timeout value, and wherein the secondary storage controller controls the secondary storage volumes, and is in a copy service relationship with a primary storage controller that controls the plurality of primary storage volumes.

13. The system of claim 8, wherein a request from a host times out if data corresponding to the request is not retrieved from the storage device within a time indicated by the storage device timeout value.

14. The system of claim 8, wherein the determining of whether the plurality of storage volumes are secondary storage volumes that are in an asynchronous copy relationship with a plurality of primary storage volumes, is performed in response to determining that a dynamic storage device timeout indicator is enabled.

15. A computer program product, the computer program product comprising a computer readable storage medium having computer readable program code embodied therewith, the computer readable program code configured to perform operations, the operations comprising:
determining whether a plurality of storage volumes controlled by a processor complex are secondary storage volumes that are in an asynchronous copy relationship with a plurality of primary storage volumes; and
changing a storage device timeout value for a storage device that stores the plurality of storage volumes from a predetermined low value to a predetermined high value, wherein the predetermined high value is indicative of a greater duration of time than the predetermined low value, in response to determining that each of the plurality of storage volumes controlled by the processor complex and stored in the storage device are secondary storage volumes that are in the asynchronous copy relationship with the plurality of primary storage volumes.

16. The computer program product of claim 15, the operations further comprising:
assigning the storage device timeout value with the predetermined low value, in response to determining that not each of the plurality of storage volumes controlled by the processor complex and stored in the storage device are secondary storage volumes that are in the asynchronous copy relationship with the plurality of primary storage volumes.

17. The computer program product of claim 15, the operations further comprising:
assigning the storage device timeout value with the predetermined low value, in response to determining that at least one storage volume of the plurality of storage volumes controlled by the processor complex and stored in the storage device is a secondary storage volume that is in a synchronous copy relationship with a primary storage volume of the plurality of primary storage volumes.

18. The computer program product of claim 16, the operations further comprising:
assigning the storage device timeout value with the predetermined low value, in response to determining that at least one storage volume of the plurality of storage volumes controlled by the processor complex and stored in the storage device is a primary storage volume that is in an asynchronous or a synchronous copy relationship with at least one secondary storage volume of the plurality of storage volumes.

19. The computer program product of claim 15, wherein the processor complex is a first processor complex of a secondary storage controller, wherein the first processor complex of the secondary storage controller performs a synchronization of the secondary storage volumes with a second processor complex of the secondary storage controller, prior to the changing of the storage device timeout value, and wherein the secondary storage controller controls the secondary storage volumes, and is in a copy service relationship with a primary storage controller that controls the plurality of primary storage volumes.

20. The computer program product of claim 15, wherein a request from a host times out if data corresponding to the request is not retrieved from the storage device within a time indicated by the storage device timeout value; and wherein the determining of whether the plurality of storage volumes controlled by a processor complex are secondary storage volumes that are in an asynchronous copy relationship with a plurality of primary storage volumes, is performed in response to determining that a dynamic storage device timeout indicator is enabled in the processor complex.

* * * * *